Oct. 2, 1951     T. DE GRAVE     2,569,748
STRAINER APPARATUS

Filed Aug. 22, 1946                             2 Sheets-Sheet 2

Inventor:
Thomas De Grave
By: Lee J. Gary
Attorney

Patented Oct. 2, 1951

2,569,748

UNITED STATES PATENT OFFICE 2,569,748

STRAINER APPARATUS

Thomas De Grave, Chicago, Ill.

Application August 22, 1946, Serial No. 692,254

3 Claims. (Cl. 210—167)

This invention relates to improvements in strainer apparatus adapted for industrial use in filtering or straining solids from fluids, and is more particularly concerned with the provision of a strainer apparatus of the back-wash type in which a counter-flow of fluid is employed to remove solids from the restricted passages provided in the strainer.

Strainer apparatus of the back-wash type have heretofore usually been provided with wire mesh screens for straining solids from fluids. During the operation of apparatus embodying screen type strainers, it has been found that hair, fibers and other solids eventually become entangled within the apertures of the screens and cannot be removed from the apertures during a backwash cycle, or removed by the use of steam while the apparatus is out of service. It was, therefore, necessary to provide the strainer apparatus with new screens in place of the clogged screens after a certain period of operation. As some forms of strainer apparatus embody several hundred, or thousand, individual wire mesh screens, it will readily be understood that the task of replacing same from time to time involved considerable time and expense.

The present invention contemplates the provision of a strainer apparatus which is simple and inexpensive in construction and which will not readily become inoperative or require replacement at frequent intervals.

This invention further contemplates the provision of an improved strainer apparatus in which the strainer is adjustable to vary the sizes of the apertures leading therethrough whereby solids of predetermined size may be strained from the fluid.

This invention further contemplates the provision of a strainer apparatus in which a fluid and entrained solids is directed axially through the interior of a cylindrical or preferably frustoconical strainer whereby the fluid, free of solids, is discharged laterally through the wall of the strainer, and the separated solids together with a small quantity of fluid is discharged axially from the strainer. By straining the solids from the fluid in the manner thus described it has been learned that the apparatus may be operated over a longer period of time before it is necessary to backwash the strainer to remove the solids from the apertures thereof.

This invention further contemplates the provision of a strainer apparatus in which the strainer is automatically adjusted to enlarge the apertures therein during the backwash cycle to facilitate the removal of hair, fibers or other solids from the apertures.

This invention further contemplates the provision of a strainer apparatus in which the backwash cycle is initiated responsive to a differential in fluid pressure at the inlet and outlet sides of the strainer apparatus, together with means for controlling the duration of the backwash cycle.

This invention further contemplates the provision of a strainer provided with apertures diverging outwardly to reduce clogging during the operating cycle and to facilitate cleaning during the backwash cycle.

It has heretofore been the practice to construct strainer apparatus of the backwash type with means for rotating the strainer. The present invention contemplates the provision of a strainer apparatus of the backwash type in which it is not necessary to provide means for rotating the strainer, thus effecting a saving in the cost of construction and operation of the apparatus.

This invention embodies other novel features, details of construction and arrangement of parts which are hereinafter set forth in the specification and claims and illustrated in the accompanying drawings wherein:

Figure 1:
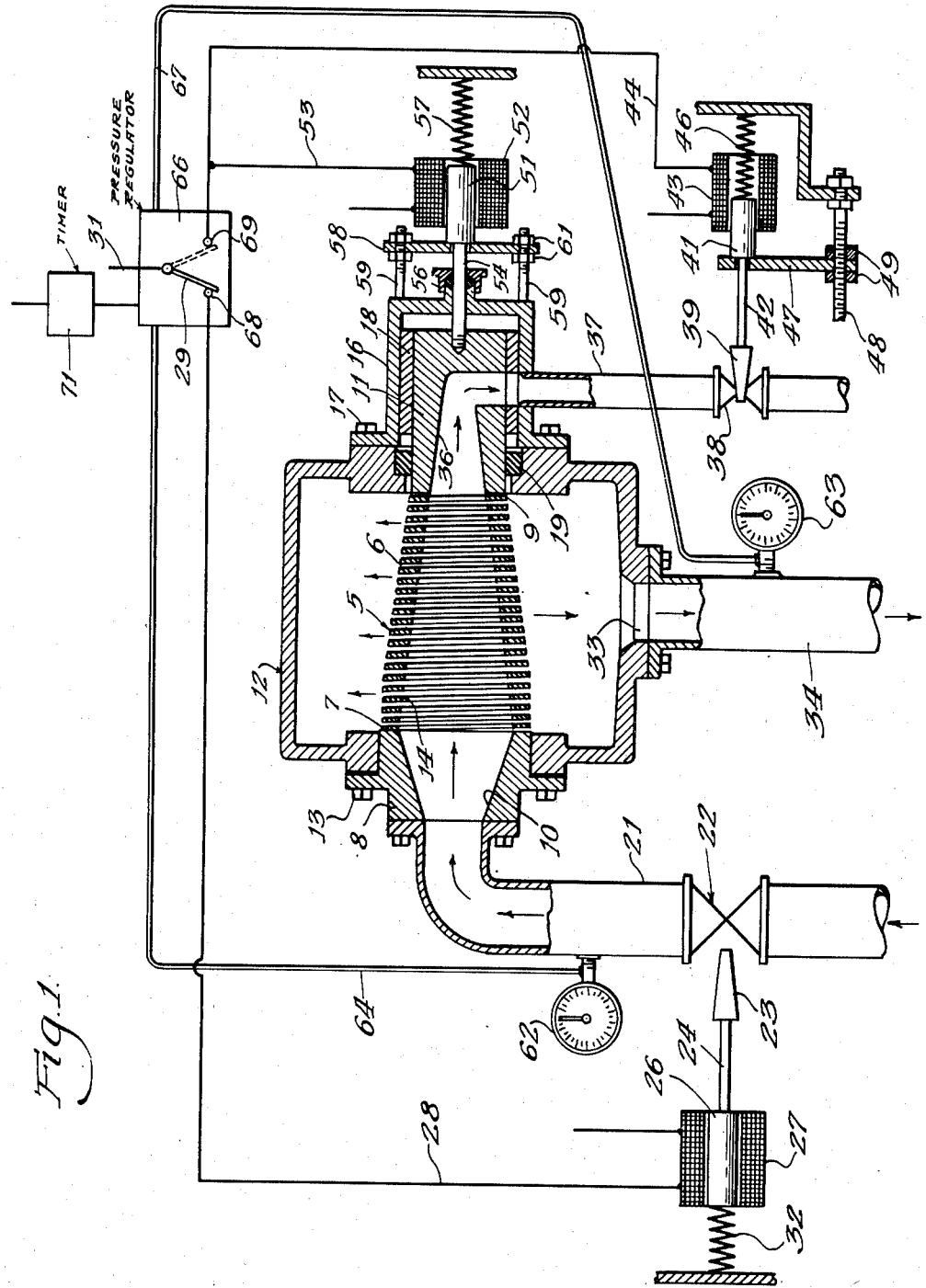
Fig. 1 is a sectional view, partly in elevation, showing a strainer apparatus embodying features of this invention.
Figure 2:
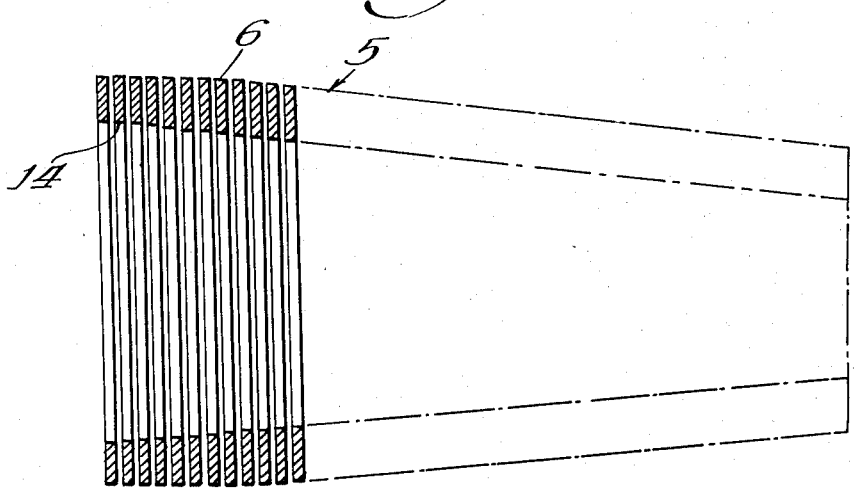
Fig. 2 is a detail longitudinal sectional view showing one form of strainer construction.

Referring now to the drawings for a better understanding of this invention, the strainer apparatus is shown as comprising a strainer 5 in the form of a helical strip of metal 6, or other suitable material, having its one end welded or otherwise secured at 7 to an inlet nozzle 8. The other end of the strip 6 is welded or otherwise secured at 9 to a solids outlet nozzle 11.

As illustrated in Fig. 1 of the drawings, the inlet nozzle 8 is preferably formed with an inwardly diverging opening 10, and is secured to one side of a strainer casing 12 by means of cap screws 13. Each convolution of the strip 6 is progressively smaller than the preceding convolution from the inlet nozzle 8 toward the solids outlet 11 to define a converging axial passage 14 within the strainer 5.

The solids outlet nozzle 11 is mounted for reciprocable movement within a bearing housing 16 secured to the strainer casing 12 by means of cap screws 17. The bearing housing 16 is preferably provided with a suitable bearing 18, and a suitable gasket 19 is provided to enclose the inner end of the solids outlet nozzle 11 between the casing 12 and the bearing housing 16.

A fluid inlet conduit 21 is provided to direct fluid to be filtered into the inlet nozzle 8 under the control of a gate valve 22 provided with a wedge gate 23. The outer end of the valve stem 24 is secured to a plunger 26 mounted for reciprocable movement within a solenoid 27. The wedge gate 23 is held in its open position when the solenoid 27 is energized by current passing through the lead 28, pressure regulator switch 29 and lead 31 connected to a source of electric current. When the solenoid 27 is de-energized, a compression spring 32 acts to move the wedge gate 23 to a closed position.

The side of the casing 12 is provided with a fluid outlet opening 33 leading into an outlet conduit 34. The solids outlet nozzle 11 is provided with a converging aperture 36 leading inwardly and then laterally to direct solids and some fluid through a solids outlet conduit 37. Wedge gate control valve 38 is interposed in the conduit 37 and is provided with a wedge gate 39 connected to a plunger 41 by means of valve stem 42. The plunger 41 is drawn rearwardly by means of a solenoid 43 to open the valve 38 when the solenoid is energized by current passing through the lead 44, pressure regulator switch 29 and lead 31. When the solenoid 43 is de-energized, the wedge gate 39 is moved toward its closed position by means of a compression spring 46. During the operation of the strainer apparatus, it is desirable to normally maintain the valve 38 in slightly open position to permit a restricted flow of solids and fluid through the conduit 37. The area of the port opening within the valve 38 during operation of the strainer apparatus is controlled by a stop arm 47 which limits the inward travel of the plunger 41 and wedge gate 39. The stop arm 47 is adjustably positioned along a threaded stud 48 by means of a pair of lock nuts 49 in order to vary the area of the valve port to suit various conditions of operation.

The solids discharge nozzle 11 is movable outwardly through the bearing housing 16 by means of a plunger 51 when the solenoid 52 is energized by current passing through the lead 53, pressure regulator switch 29, and lead 31. The plunger 51 is provided with a shaft 54 which extends through a stuffing box 56 for threaded engagement in the outer end of the solids discharge nozzle 11. When the solenoid 52 is de-energized, the plunger 51 and nozzle 11 are moved inwardly by means of a compression spring 57. During inward movement of the plunger 51 and nozzle 11, the plunger 51 is moved into engagement with a stop member 58 which is adjustably positioned upon a pair of threaded stud members 59 by means of adjustment nuts 61.

Pressure gauges 62 and 63 are provided for the conduits 21 and 34 respectively to indicate the pressure of the fluid passing therethrough. The conduit 64 is provided to deliver fluid under pressure from the conduit 21 to the pressure regulator 66, and a conduit 67 is provided to deliver fluid under pressure from a conduit 34 to the pressure regulator. The pressure regulator 66 may be of any well known commercially available construction in which differential pressure causes the switch arm 29 to move between the contact members 68 and 69.

During the operation of the strainer apparatus thus described, fluid to be strained is delivered through the conduit 21 and inlet nozzle 8, to the interior of the strainer 5. The fluid within the axial passage 14 of the strainer is adapted to pass laterally between the several convolutions of the strip 6 and is then discharged from the casing 12 through the outlet nozzle 33 and conduit 34. It will be understood that the several convolutions of the strip 6 are spaced apart a predetermined distance to prevent the passage of predetermined size solids outwardly between the several convolutions. As the fluid is being thus treated the solids confined within the axial passage 14 are caused to gradually pass into the converging passage 36 of the solids outlet nozzle 11 and thence through the conduit 37. The spacing between the several convolutions of the strip 6 may be increased or decreased depending upon the size of solids to be strained from the fluid, and this variation in spacing may be accomplished by merely adjusting the position of the arm 58 along the studs 59 by means of the locking nuts 61. During the straining operation it will be noted that the solenoid 27 is energized to maintain the valve 22 in open position, and that the solenoid 43 is de-energized to leave the valve 38 in partly open position.

After the straining operation has continued for a certain length of time, depending upon the type of fluid being strained, the solids within the axial opening 14 of the strainer 5 tend to obstruct the passages between the several convolutions of the strip 6 and thus create a differential in pressure within the conduits 21 and 34, causing the pressure regulator switch 29 to move from the contact 68 to the contact 69. Movement of the switch 29 from the contact 68 to the contact 69 acts to complete the circuit to the solenoid 43 and to break the circuit to the solenoid 27. When the solenoid 27 is de-energized, the spring 32 acts to close the valve 22, and the plunger 41 acts to open the valve 38. When valve 22 is closed and the valve 38 is opened, the fluid within the conduit 34 moves in a reverse direction through the spaces between the several convolutions of the strip 6, and thence through the axial passage 14 of the strainer into the passage 36 and conduit 37. This reverse flow of fluid, caused by a back surge of fluid in the conduit 34, acts to remove solids from the sides and inner edges of the several convolutions of the strip 6 and to discharge the removed solids into the passage 36 and conduit 37.

In order to facilitate the cleaning of the strainer 5 during this backwash operation, the solenoid 52 is energized by movement of the switch 29 against the contact member 69 to draw the plunger 51 and solids outlet nozzle 11 outwardly to thus increase the spacing between the several convolutions of the strip 6. It will be noted that outward movement of the nozzle 11 acts to stretch the helical strip 6 to enlarge the spaces between the several convolutions thereof.

When the pressure within the conduits 21 and 34 becomes equalized, the pressure regulator acts to move the switch 29 from the contact 69 back to the contact 68 to restore the strainer apparatus to its initial operating position in which the valve 22 is open, the valve 38 is partly open, and the nozzle 11 is in its inner position. If desired, a timer 71 may be employed for controlling the period of time during which the switch 29 is maintained in contact with the contact 69 and thus control the duration of the backwash cycle.

As timers and pressure regulators are now available on the market, it is not believed necessary to more particularly set forth the operation and construction of same.

Figure 3:
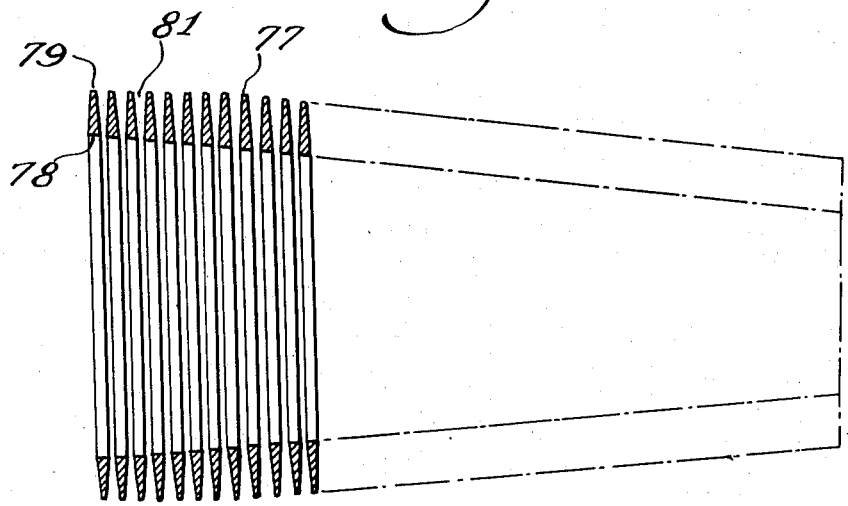
Fig. 3 is a detailed longitudinal sectional view illustrating a modified form of strainer construction.

Fig. 3 in the drawing illustrates a modified form of strainer construction in which a helical strip 77 is reduced in cross section from its inner edge 78 to its outer edge 79 to provide a plurality of outwardly converging passages 81 between the several convolutions of the strip. It will be noted that this type of strainer construction facilitates cleaning of the strainer during the backwash operation, and further that solids will not have a tendency to clog up between opposing side walls of adjacent convolutions.

While this invention has been shown in but two forms, it is obvious to those skilled in the art that it is not so limited but is susceptible of various changes and modifications without departing from the spirit and scope of the claimed invention.

I claim as my invention:

1. In a strainer apparatus for separating solids of predetermined size from fluids, a strainer housing, a helical strip forming a strainer, the inner edge of said strip defining an inwardly converging axial passage for fluids and solids, the convolutions of said strip being spaced apart for the passage therebetween of fluid free of solids of predetermined size, inlet means for directing a stream of fluid and solids into the inlet end of the axial passage of said strainer, the inlet end of said strainer strip being secured to said strainer housing, fluid outlet means to receive fluid passing outwardly between the convolutions of said strip, solids outlet means to receive solids and some fluid from the outlet end of the axial passage of said strainer, said solids outlet means including a solids outlet nozzle mounted for reciprocable movement relative to said strainer housing and secured to the outlet end of said strainer strip, means for axially moving said solids outlet nozzle, and means responsive to a predetermined differential in pressure within said inlet means and said fluid outlet means to actuate said nozzle moving means to vary the spacing between the convolutions of said strainer strip.

2. In a strainer apparatus for separating solids of predetermined size from fluids, a strainer housing having a fluid inlet, fluid outlet and solids outlet, a helical strip mounted within said housing and having its one end secured to said housing adjacent said fluid inlet, a solids outlet nozzle mounted for reciprocable movement relative to said housing and secured to the other end of said helical strip, the inner edge of said strip defining an axial passage leading from said fluid inlet to said solids outlet nozzle convergent in the direction of flow from said fluid inlet to said solids outlet nozzle, the convolutions of said helical strip being spaced apart whereby the fluid free of solids passes between the convolutions and out of the housing through said fluid outlet, valve means for said fluid inlet for controlling continuous flow of fluid into said housing, valve means for said solids outlet for controlling continuous flow of solids-laden fluid from said outlet to cause continuous axial flow of said solids-laden fluid through said axial passage, and electrical control means responsive to a predetermined differential in pressure within said fluid inlet and fluid outlet to move said solids outlet nozzle to increase the spacing between the several convolutions of the helical strip, to close said fluid inlet valve means and to open said solids outlet valve means.

3. In a strainer apparatus for separating solids of predetermined size from fluids, a strainer housing having an inlet for solids-laden fluid, an outlet for solids-laden fluid and an outlet for solids-free fluid, a helical member forming a strainer positioned in said housing, the inner edge of said member defining a passage connecting said inlet to said solids-laden fluid outlet, the walls of said passage converging from said inlet to said solids-laden outlet, the convolutions of said member being spaced apart for the passage therebetween of solids-free fluid from said passage to said solids-free fluid outlet, means for continuously introducing solids-laden fluid into said inlet, means interposed between said helical member and said solids-laden fluid outlet for controllably restricting the flow of solids-laden fluid to said solids-laden fluid outlet, and means for continuously removing solids-free fluid from said solids-free fluid outlet, means for anchoring the inlet end of said strainer to said housing adjacent the inlet to said housing, a movable member carried within said housing having a tapered passageway comprising a portion of said solids-laden fluid outlet, means connecting said movable member to the outlet end of said strainer, and means for moving said movable member axially of said strainer to change the spacing of the convolutions of said helical member.

THOMAS DE GRAVE.

REFERENCES CITED

The following references are of record in the file of this patent:

UNITED STATES PATENTS

| Number | Name | Date |
|---|---|---|
| 408,487 | Jewell | Aug. 6, 1889 |
| 765,182 | King | July 19, 1904 |
| 1,150,910 | Warmington | Aug. 24, 1915 |
| 1,273,656 | Paget | July 23, 1918 |
| 2,006,405 | Monroe | July 2, 1935 |
| 2,066,479 | MacIsaac | Jan. 5, 1937 |
| 2,100,266 | Perry | Nov. 23, 1937 |
| 2,183,577 | McNeal | Dec. 19, 1939 |
| 2,184,177 | Burrell | Dec. 19, 1939 |
| 2,197,971 | Elze et al. | Apr. 23, 1940 |
| 2,217,751 | Hughes | Oct. 15, 1940 |
| 2,383,672 | Neisingh | Aug. 28, 1945 |
| 2,429,417 | Magill | Oct. 21, 1947 |

FOREIGN PATENTS

| Number | Country | Date |
|---|---|---|
| 65,189 | Germany | Nov. 1, 1892 |